US011703048B2

(12) United States Patent
Sanders et al.

(10) Patent No.: US 11,703,048 B2
(45) Date of Patent: Jul. 18, 2023

(54) SYSTEMS AND METHODS FOR A TANGENT DRIVE HIGH PRESSURE PUMP

(71) Applicant: Enfield Engine Company, LLC, Enfield, NH (US)

(72) Inventors: Nicholas A. Sanders, Enfield, NH (US); Ryan Thomas Kiley Sanders, Enfield, NH (US)

(73) Assignee: Enfield Engine Company, Inc., Enfield, NH (US)

( * ) Notice: Subject to any disclaimer, the term of this patent is extended or adjusted under 35 U.S.C. 154(b) by 302 days.

(21) Appl. No.: 17/104,681

(22) Filed: Nov. 25, 2020

(65) Prior Publication Data

US 2021/0277889 A1 Sep. 9, 2021

Related U.S. Application Data

(60) Provisional application No. 62/985,020, filed on Mar. 4, 2020.

(51) Int. Cl.
*F04B 53/14* (2006.01)
*F16C 3/02* (2006.01)
(Continued)

(52) U.S. Cl.
CPC .............. *F04B 53/14* (2013.01); *F16C 3/02* (2013.01); *F16C 17/02* (2013.01);
(Continued)

(58) Field of Classification Search
CPC .. F04B 53/14; F16C 3/02; F16C 17/02; F16C 2202/04; F16C 2204/60; F16C 2300/02;
(Continued)

(56) References Cited

U.S. PATENT DOCUMENTS 1,056,746 A 3/1913 Pitts
1,090,647 A 3/1914 Pitts
(Continued)

FOREIGN PATENT DOCUMENTS

BE 1006128 A3 5/1994
CN 1800609 A 7/2006
(Continued)

OTHER PUBLICATIONS

Clark et al., "The Influence of Sinusoidal Piston Motion on the Thermal Efficiency of Engines," SAE Technical Paper Series 871916, 12 pages, downloaded Jan. 26, 2020.
(Continued)

*Primary Examiner* — Syed O Hasan
(74) *Attorney, Agent, or Firm* — Cesari & McKenna, LLP

(57) ABSTRACT

Systems and methods are described for a reciprocating mechanism. The system includes at least one axially translating y-axis component configured to reciprocate substantially along a y-axis with a reciprocating motion of a piston assembly relative to a base. The system also includes at least one x-axis component slidingly coupled via at least one bearing assembly to and translating with the at least one y-axis component along the y-axis. The at least one x-axis component is configured to reciprocate substantially perpendicularly to the y-axis relative to the at least one y-axis component, and includes an orbital output component and an orbital linking component disposed substantially concentric with the orbital output component. The system also includes a stationary output component rotatably attached to the base in a direction that is substantially perpendicular to both the x-axis and y-axis, and a stationary linking component rotatably attached to the base in a direction that is substantially concentric with the stationary output component.

52 Claims, 10 Drawing Sheets

US 11,703,048 B2
Page 2

(51) Int. Cl.
*F16C 17/02* (2006.01)
*F16J 7/00* (2006.01)

(52) U.S. Cl.
CPC ...... *F16C 2202/04* (2013.01); *F16C 2204/60* (2013.01); *F16C 2300/02* (2013.01); *F16C 2360/42* (2013.01); *F16J 7/00* (2013.01)

(58) Field of Classification Search
CPC ...... F16C 2360/42; F16C 7/023; F16C 35/02; F16J 7/00; F02B 75/20
See application file for complete search history.

(56) References Cited

U.S. PATENT DOCUMENTS

| | | | |
|---|---|---|---|
| 2,366,237 | A | 1/1945 | Clausen |
| 2,513,514 | A | 7/1950 | Poage |
| 3,886,805 | A | 6/1975 | Koderman |
| 4,013,048 | A | 3/1977 | Reitz |
| 4,433,649 | A | 2/1984 | Shin |
| 4,485,768 | A | 12/1984 | Heniges |
| 4,512,291 | A | 4/1985 | Kirk |
| 4,598,672 | A | 7/1986 | Jayne et al. |
| 5,067,456 | A | 11/1991 | Beachley et al. |
| 5,178,038 | A | 1/1993 | Heniges |
| 5,528,946 | A | 6/1996 | Yadegar |
| 5,702,238 | A | 12/1997 | Simmons et al. |
| 5,873,339 | A | 2/1999 | Isogai |
| 5,934,243 | A | 8/1999 | Kopystanski |
| 6,510,831 | B2 | 1/2003 | Wiseman |
| 9,316,249 | B2 | 4/2016 | Yoshizawa et al. |
| 9,410,477 | B2 | 8/2016 | Sanders |
| 9,958,041 | B2 | 5/2018 | Sanders et al. |
| 10,138,807 | B2 | 11/2018 | Yoshizawa et al. |
| 10,378,578 | B1 * | 8/2019 | Araujo ............ F02B 75/32 |
| 10,436,296 | B2 | 10/2019 | Sanders et al. |
| 2002/0185101 | A1 | 12/2002 | Shaw |
| 2004/0255879 | A1 | 12/2004 | Zaytsev |
| 2005/0217618 | A1 | 10/2005 | Watanabe et al. |
| 2006/0005793 | A1 | 1/2006 | Ward |
| 2006/0207358 | A1 | 9/2006 | Tung |
| 2007/0169739 | A1 * | 7/2007 | Meyer ............ F02B 75/048 |
| | | | 123/78 E |
| 2008/0223320 | A1 | 9/2008 | Chepettchouk |
| 2009/0272259 | A1 | 11/2009 | Cook et al. |
| 2010/0031916 | A1 | 2/2010 | Wiseman |
| 2010/0109343 | A1 | 5/2010 | Lemke et al. |
| 2011/0107998 | A1 | 5/2011 | Xiong et al. |
| 2011/0138939 | A1 | 6/2011 | Carr |
| 2012/0312273 | A1 | 12/2012 | Weverka |
| 2013/0098335 | A1 | 4/2013 | Diggs |
| 2013/0186365 | A1 * | 7/2013 | Laimboeck ............ F01B 7/16 |
| | | | 123/193.6 |
| 2015/0053168 | A1 * | 2/2015 | Abazid ............ F02B 75/32 |
| | | | 123/197.3 |

FOREIGN PATENT DOCUMENTS

| | | |
|---|---|---|
| CN | 1928337 A | 3/2007 |
| CN | 100419234 C | 9/2008 |
| DE | 336037 C | 4/1921 |
| DE | 348020 C | 2/1922 |
| FR | 2927122 A1 | 8/2009 |
| GB | 173554 A | 12/1921 |
| WO | WO-03/087556 A1 | 10/2003 |
| WO | WO-2004/072441 A1 | 8/2004 |
| WO | WO-2008/124816 A1 | 10/2008 |
| WO | WO-2009/120715 A1 | 10/2009 |

OTHER PUBLICATIONS

Lee et al., "Thermodynamic Implications of the Stiller-Smith Mechanism," SAE Technical Paper Series 870615, 12 pages, downloaded Jan. 26, 2020.
Smith et al., "A Compression Ignition Engine Comparison Between a Slider-Crank and a Cross-Slider Based Engine," SAE Technical Paper Series 900131, 15 pages, downloaded Jan. 26, 2020.
Smith et al., "The Stiller-Smith Mechanism: A Kinematic Analysis," SAE Technical Paper Series 860535, 12 pages, downloaded Jan. 27, 2020.
Yoshizawa et al., "Development of a Mechanism for a Higher Efficiency Compressor Using an Orthogonal Double-Slider Joint," The 2nd IFToMM Asian Conference on Mechanism and Machine Science, Nov. 7-10, 2012, Tokyo, Japan, 7 pages.
Yoshizawa et al., "Experimental Analysis of a Water-Pump Driving Mechanism Using an Orthogonal Double-Slider Joint," Mechanical Engineering Journal, vol. 3, No. 1, 2016, 12 pages.
International Search Report and Written Opinion dated Mar. 18, 2021, PCT/US2020/063642, 13 pages.
Genaro Tabag "Major Engine Problems Solved by the Francis Daimler Tabag Engine" Youtube.com, 2012.
Genaro Tabag "Super-Efficient Engine (Inventor: Genaro Tabag)" Youtube.com, 2012.
International Search Report and Written Opinion issued in International Application No. PCT/US2014/040722 dated Sep. 23, 2014.
International Search Report and Written Opinion issued in International Application No. PCT/US2016/046033 dated May 4, 2017.
Mekanizmalar "Short Stroke Reciprocating Mechanism" Youtube.com, 2013.
"Model: S16 Hypocycloid Straight-Line Mechanism" Kinematic Models for Design Digital Library, 2016.
"Model: UK032 Hypocycloid Two-Gear Straight-Line Mechanism" Kinematic Models for Design Digital Library, 2016.
Shelley "Planetary Gears Do Away with Side Forces" Eureka Magazine, 2004.
Yoshizawa et al "Development of a Mechanism for a Higher Efficiency Compressor Using an Orthogonal Double-Slider Joint" The Second IFToMM Asian Conference on Mechanism and Machine Science, 2012.
Yoshizawa et al "Experimental Analysis of a Water-Pump Driving Mechanism Using an Orthogonal Double-Slider Joint" Mechanical Engineering Journal vol. 3, 2016.

* cited by examiner

SYSTEMS AND METHODS FOR A TANGENT DRIVE HIGH PRESSURE PUMP

CROSS-REFERENCE TO RELATED APPLICATION

This application claims the benefit of U.S. Provisional Application No. 62/985,020, filed Mar. 4, 2020, which is incorporated by reference herein in its entirety.

TECHNICAL FIELD

This application relates generally to reciprocating engines, pumps, and compressors. In particular, this application relates to power delivery devices for reciprocating engines, pumps, and compressors, and to related systems and methods.

BACKGROUND

A reciprocating engine generally uses a crankshaft—connecting rod mechanism to convert the linear reciprocating motion of one or more pistons translating within cylinders into the rotational motion of the crankshaft and vice versa. This type of mechanism is herein referred to as a power delivery device. For example, the internal combustion engine (IC engine) is the most common type of reciprocating engine. Reciprocating engines are generally used to convert the chemical energy released during the combustion of various fuels (such as gasoline) or thermal energy (such as energy derived from steam) into kinetic energy (e.g., mechanical rotating motion), which can be more readily usable to move things (e.g., propel objects). The crankshaft of a reciprocating engine is typically the engine element that is connected to output devices used to move various devices or vehicles, such as automobiles, generators, trucks, airplanes, welders, ships, bulldozers, motorcycles, boats, etc.

One challenge with power delivery devices generally has been to maximize the amount of usable power that is able to be transitioned through the device. This is true for reciprocating engines (e.g., internal combustion engines) along with other types of engines, pumps and compressors. Traditional power delivery devices are not necessarily capable of optimal power delivery due to constraints that are often a result of the way the power delivery device itself is constructed. Especially where industries in which power delivery devices are used become increasingly focused on minimizing energy losses where possible, there is a need for more efficient power delivery devices, including those from which power can be more effectively transitioned through the device as compared to traditional, previously-available devices.

SUMMARY

The technology, in one aspect, features a system including a reciprocating mechanism. The system includes at least one axially translating y-axis component configured to reciprocate substantially along a y-axis with a reciprocating motion of a piston assembly relative to a base to which the piston assembly is slidingly attached via at least one bearing assembly. The system further includes at least one x-axis component slidingly coupled via at least one bearing assembly to and translating with the at least one y-axis component along the y-axis. The at least one x-axis component includes an orbital output component and an orbital linking component disposed substantially concentric with the orbital output component.

The system further includes a stationary output component rotatably attached to the base in a direction that is substantially perpendicular to both the x-axis and y-axis. The stationary output component is configured to engage with the orbital output component via a first integral interconnecting output link. The system further includes a stationary linking component rotatably attached to the base in a direction that is substantially concentric with the stationary output component. The stationary linking component configured to engage with the orbital linking component of the at least one x-axis component via the first integral interconnecting link.

The technology can further include any of the following features.

In some embodiments, the at least one x-axis component is configured to reciprocate substantially perpendicularly to the y-axis relative to the at least one y-axis component. In some embodiments, the x-axis component is slidingly attached to a bearing shaft via plain bushing bearings. For example, in some embodiments, the plain bushing bearings include at least one plain bushing bearing assembly fixed to the at least one x-axis component and slidingly attached to the at least one y-axis component via a shaft on which the plain bushing bearing slides. In other embodiments, the plain bushing bearings include at least one plain bushing bearing assembly fixed to the at least one y-axis component and slidingly attached to the at least one x-axis component via a shaft on which the plain busing bearing slides.

In some embodiments, the shaft is a hardened polished steel shaft. In some embodiments, the piston assembly includes a piston and a piston rod. For example, in some embodiments, the piston rod is slidingly attached to the base via a plain busing bearing. In some embodiments, the piston rod is a hardened polished steel shaft.

In some embodiments, one or more y-axis components are slidingly coupled to the x-axis component. For example, in some embodiments each y-axis component is attached to and reciprocating with a corresponding piston assembly.

In some embodiments, each of the bearing assemblies includes a plain bushing bearing. For example, in some embodiments, the plain bushing bearings is made of at least one of Babbitt soft metal; or engineered industrial plastics, available from many manufacturers, such as: Dupont's Bearing Grade SP-21 VESPEL® or Bearing Grade 4540 TORLON®, or Bearing Grade PEEK®; or a recirculating ball type linear bushing.

In some embodiments, the bearing assemblies include at least one recirculating ball bushing assembly. In some embodiments, each of the bearing assemblies includes a plain busing bearing including a commercial plastic bearing material.

The technology, in another aspect, features a reciprocating engine. The reciprocating engine includes at least one axially translating y-axis component configured to reciprocate substantially along a y-axis with a reciprocating motion of a piston assembly relative to a base to which the piston assembly is slidingly attached via at least one bearing assembly. The reciprocating engine further includes at least one x-axis component slidingly coupled via at least one bearing assembly to and translating with the at least one y-axis component along the y-axis. The at least one x-axis component includes an orbital output component and an orbital linking component disposed substantially concentric with the orbital output component. In some embodiments, the at least one x-axis component is configured to reciprocate substantially perpendicularly to the y-axis relative to the at least one y-axis component.

The reciprocating engine further includes a stationary output component rotatably attached to the base in a direction that is substantially perpendicular to both the x-axis and y-axis. The stationary output component configured to engage with the orbital output component via a first integral interconnecting output link. The reciprocating engine further includes a stationary linking component rotatably attached to the base in a direction that is substantially concentric with the stationary output component. The stationary linking component configured to engage with the orbital linking component of the at least one x-axis component via the first integral interconnecting link.

The technology, in another aspect, features a reciprocating compressor. The reciprocating compressor includes at least one axially translating y-axis component configured to reciprocate substantially along a y-axis with a reciprocating motion of a piston assembly relative to a base to which the piston assembly is slidingly attached via at least one bearing assembly. The reciprocating compressor further includes at least one x-axis component slidingly coupled via at least one bearing assembly to and translating with the at least one y-axis component along the y-axis. The at least one x-axis component includes an orbital output component and an orbital linking component disposed substantially concentric with the orbital output component. In some embodiments, the at least one x-axis component is configured to reciprocate substantially perpendicularly to the y-axis relative to the at least one y-axis component.

The reciprocating compressor further includes a stationary output component rotatably attached to the base in a direction that is substantially perpendicular to both the x-axis and y-axis. The stationary output component configured to engage with the orbital output component via a first integral interconnecting output link. The reciprocating compressor further includes a stationary linking component rotatably attached to the base in a direction that is substantially concentric with the stationary output component. The stationary linking component configured to engage with the orbital linking component of the at least one x-axis component via the first integral interconnecting link.

The technology, in another aspect, features a reciprocating pump. The reciprocating pump includes at least one axially translating y-axis component configured to reciprocate substantially along a y-axis with a reciprocating motion of a piston assembly relative to a base to which the piston assembly is slidingly attached via at least one bearing assembly. The reciprocating pump further includes at least one x-axis component slidingly coupled via at least one bearing assembly to and translating with the at least one y-axis component along the y-axis. The at least one x-axis component includes an orbital output component and an orbital linking component disposed substantially concentric with the orbital output component. In some embodiments, the at least one x-axis component is configured to reciprocate substantially perpendicularly to the y-axis relative to the at least one y-axis component.

The reciprocating pump further includes a stationary output component rotatably attached to the base in a direction that is substantially perpendicular to both the x-axis and y-axis. The stationary output component configured to engage with the orbital output component via a first integral interconnecting output link. The reciprocating pump further includes a stationary linking component rotatably attached to the base in a direction that is substantially concentric with the stationary output component. The stationary linking component configured to engage with the orbital linking component of the at least one x-axis component via the first integral interconnecting link.

BRIEF DESCRIPTION OF THE DRAWINGS

The advantages of the systems and methods described herein, together with further advantages, may be better understood by referring to the following description taken in conjunction with the accompanying drawings. The drawings are not necessarily to scale, emphasis instead generally being placed upon illustrating the principles of the described embodiments by way of example only.

DETAILED DESCRIPTION

Figure 1:
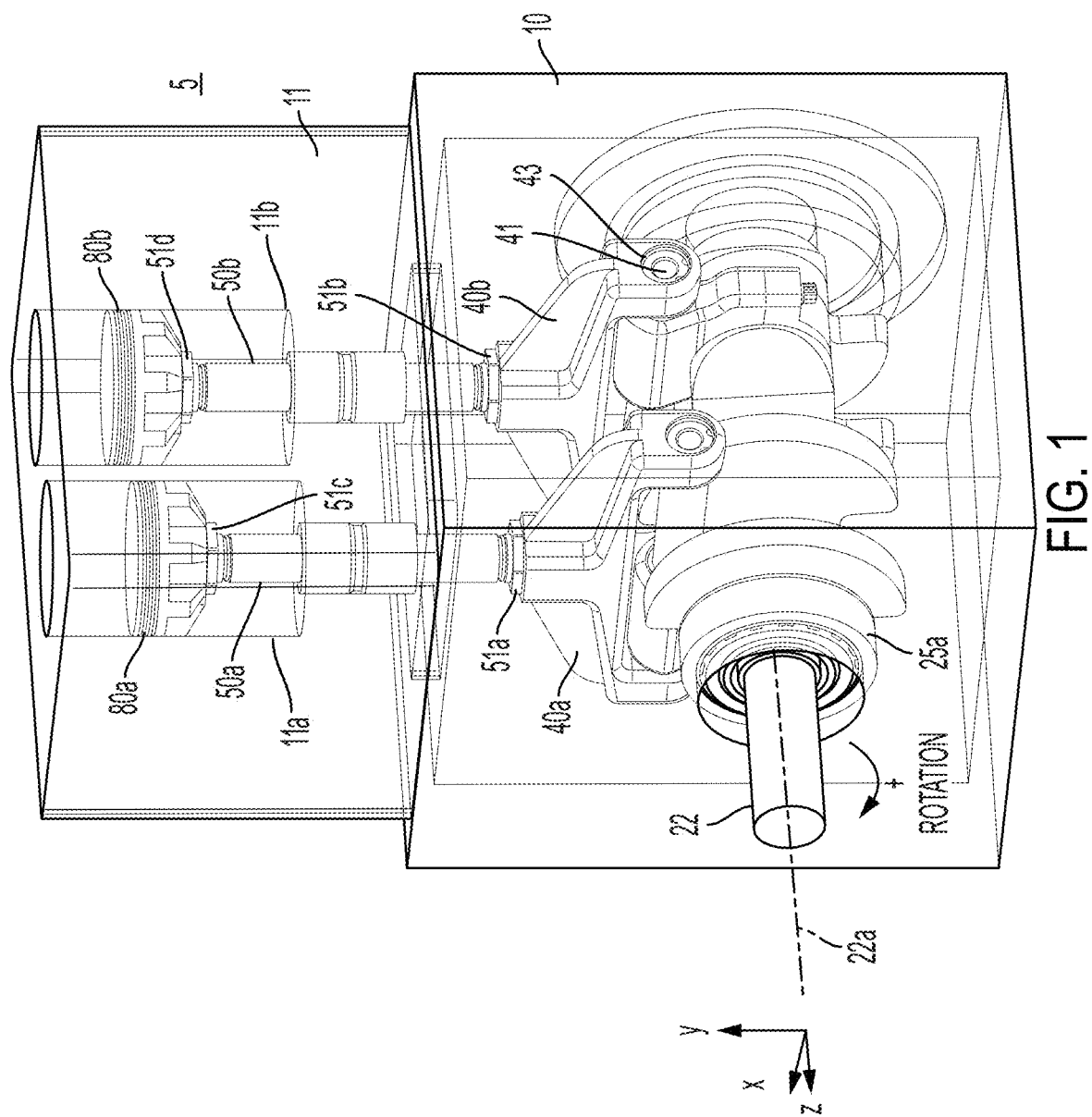
FIG. 1 is a perspective view of an exemplary tangent drive mechanism, according to embodiments of the technology described herein.

The technology features a novel tangent drive mechanism that has several inventive features over that which is already known. For example, the technology described herein includes improvements over the tangent drive mechanisms described in U.S. Pat. Nos. 9,958,041, 10,436,296, 10,801,590, and 10,851,877. In addition, the technology described herein includes improvements over similar existing drive mechanisms such as the Scotch Yoke, Stiller-Smith, and the Double-Slider mechanism described in U.S. Pat. Nos. 10,138,807 and 9,316,249. The tangent drive mechanism described herein has been developed for various applications, including engines, pumps, and compressors. All of the above prior art mechanisms have the beneficial attribute of generating, as does the tangent drive mechanism of the current invention, pure sinusoidal piston movement. This sinusoidal piston movement has several thermodynamic advantages over the piston motion generated by the slider-crank arrangement of traditional crankshaft-connecting rod mechanisms. These thermodynamic advantages have been disclosed in several engineering publications including SAE International publication no. 870615 (Thermodynamic Implications of the Stiller-Smith Mechanism). The prior art mechanisms, however, generate this movement with inventive yet intricate designs that are overly complicated and inefficient.

For example, the tangent drive invention of U.S. Pat. Nos. 9,316,249, 10,138,807, 10,801,590, and 10,851,877 describe a typical embodiment which uses hypocycloid gearing to generate the sinusoidal reciprocating movement of a piston. The geared embodiment is expensive to produce and has the disadvantage of higher frictional losses due to the gearing. Also, the prior art tangent drive mechanism requires multiple linear bearings for each axis of movement, this is true for either a geared or non-geared embodiment of U.S. Pat. No. 10,851,877. Each bearing is a source of additional frictional losses. As described herein, by slidingly connecting an embodiment piston rod assembly directly to an embodiment base the tangent drive mechanism is simplified by then allowing the piston and piston rod assembly to function as the y-axis component.

As a further example, the Scotch Yoke mechanism requires the direct engagement and sliding of the rotating crankshaft journal on a linear slide groove perpendicularly attached to either a piston rod or rod slide. The required material strength, the required tolerances, the rapid wear of parts, and frictional losses of this mechanism are very high. This unconventional use of the crankshaft journal has kept this mechanism out of mainstream use in reciprocating engines, pumps, and compressors for more than one hundred years. As a further example, the Stiller-Smith mechanism uses a complicated, many-component linkage mechanism to generate the sinusoidal piston movement. This mechanism has high frictional losses, many-parts reliability issues, dynamic balancing issues, and is expensive to produce. This mechanism was used in academic research laboratories to study the benefits of sinusoidal piston movement but was never moved to a practical producible mechanism. As still a further example, the Double Slider mechanism requires a fixed L-Bracket relationship between moving axis and multiple Dove Tail slides to control the linear slide movement. The restrictive nature of the mechanisms L-Bracket design limits application and cost effectiveness. The sliding components yield high frictional losses, difficult dynamic balancing problems and costly manufacture.

In one embodiment, the tangent drive mechanism of the current invention includes at least one y-axis component comprising at least one piston assembly which is directly and slidingly attached to the base of an engine, pump, or compressor via at least one linear plain bushing bearing assembly, or the like. The y-axis component then being constrained to reciprocate in the y-direction only by combination of the piston guides (seals or rings) and the at least one linear plain bushing bearing fixed to the base and slidingly attached to the piston rod of the piston assembly. The y-axis component then includes a piston assembly, including a piston rod, a guiding and/or constraining linear plain bushing bearing attached to the base and slidingly attached to the piston rod, and a slidingly attached x-axis component assembly which is constrained to translate with and move substantially perpendicular to the y-axis component. By applying the y-axis component directional constraint to the piston, piston rod and base, the overall mechanism is greatly simplified. Allowing, for example, multiple pistons at various angles from each other on a single crank throw. Constraining each piston assembly at its corresponding angle via corresponding y-axis component (piston and piston rod) assemblies slidingly attached to the base at the corresponding angle.

The x-axis component assembly is slidingly attached via at least one linear plain bushing bearing assembly to the y-axis component assembly, and in the preferred embodiment encompasses a hardened steel shaft that is affixed to either the y-axis component or the x-axis component, and the at least one linear plain bushing bearing which is slidingly attached to the shaft and interfaces with either the y-axis or x-axis component. The x-axis component assembly also being rotatably attached via a plain journal bearing to, and being driven by or driving, a crank throw. In some embodiments, a single x-axis component, on a single crank throw, can have multiple y-axis components slidingly attached to it at various angles from each other. The angles being set by the y-axis components placement in the base. In some embodiments, multiple x-axis components, on a single crank throw, can be slidingly attached to multiple y-axis components at various angles from each other. The angles again being set by the y-axis components placement in the base. In some embodiments, active oiling of the bearings will be accomplished through drilled oil passages in the crankshaft, plain bearings, x-axis component assemblies, y-axis component assemblies and machine base assemblies. In some embodiments, the use of balancing weights and/or additional y-axis (or y-plate) assemblies with the preferred connection through a bicycle crank link is necessary for overall dynamic mechanism balancing.

The need for mitigating bearing frictional losses, the need for very long bearing life, and the need to keep the mechanism workable for both single and double acting machines are some of the considerations that led to the tangent drive mechanism described herein, particularly on the sliding connection of the x-axis to y-axis components. Plain bearings are bearings that essentially operate on a thin film of oil, which under ideal conditions eliminates almost all friction between two moving surfaces. The use of plain bushing bearings may also require strong forced oiling of the interface between the rotating or moving surfaces.

In one embodiment, the bushing bearings are made from either a plain soft metal (such as Babbitt) or an industrial bearing grade plastic such as SP-21 VESPEL® and may be strongly oiled. A relatively high oil pressure may be required because of the reciprocating nature of the machines and the fact that during operation the x-axis component (or x-plate) assembly stops and reverses direction every 180 degrees of crankshaft rotation. This motion causes the oiling requirement to behave both hydrodynamically and hydrostatically. To ensure that the high dynamic operating oil pressure does not deplete the oil gap of oil during direction reversals, check valves, in some cases may be required. Because the x-plate is attached to the output crank link or shaft a strong oil flow can typically be supplied through the shaft. Depending upon which plate the bushing bearing is attached to (either the x-plate or y-plate) accommodating the oil passages may be more involved. In some embodiments, the bushing bearing assembly is fixed on the x-axis component (x-plate) assembly where one simple drilled passage is required.

In some embodiments, bushing bearing materials of the highest quality are used, in addition to the use of oiled Babbitt, the use of tough industrial plastics will make the simple design one of long life. VESPEL®, TORLON® and Peek® are three petrochemical plastics from three separate manufactures that are preferred materials for the plain bushing bearings of the current tangent drive invention. There are many specific grades and types of each of the above manufacture plastics. The bearing bushings of the current invention is the ideal application for these plastic materials in that they are specifically made and marketed for applications that exhibit the behavior of intermittent, or stop and go, bearing movement realized by the reciprocating (back and forth) movement of both the x-axis and y-axis components of the tangent drive. For example, SP-21 VESPEL® is a plastic grade that can be run with no lubrication and perform as well or better with the same friction coefficient as oiled Babbitt in bushing bearing application.

Figure 2:
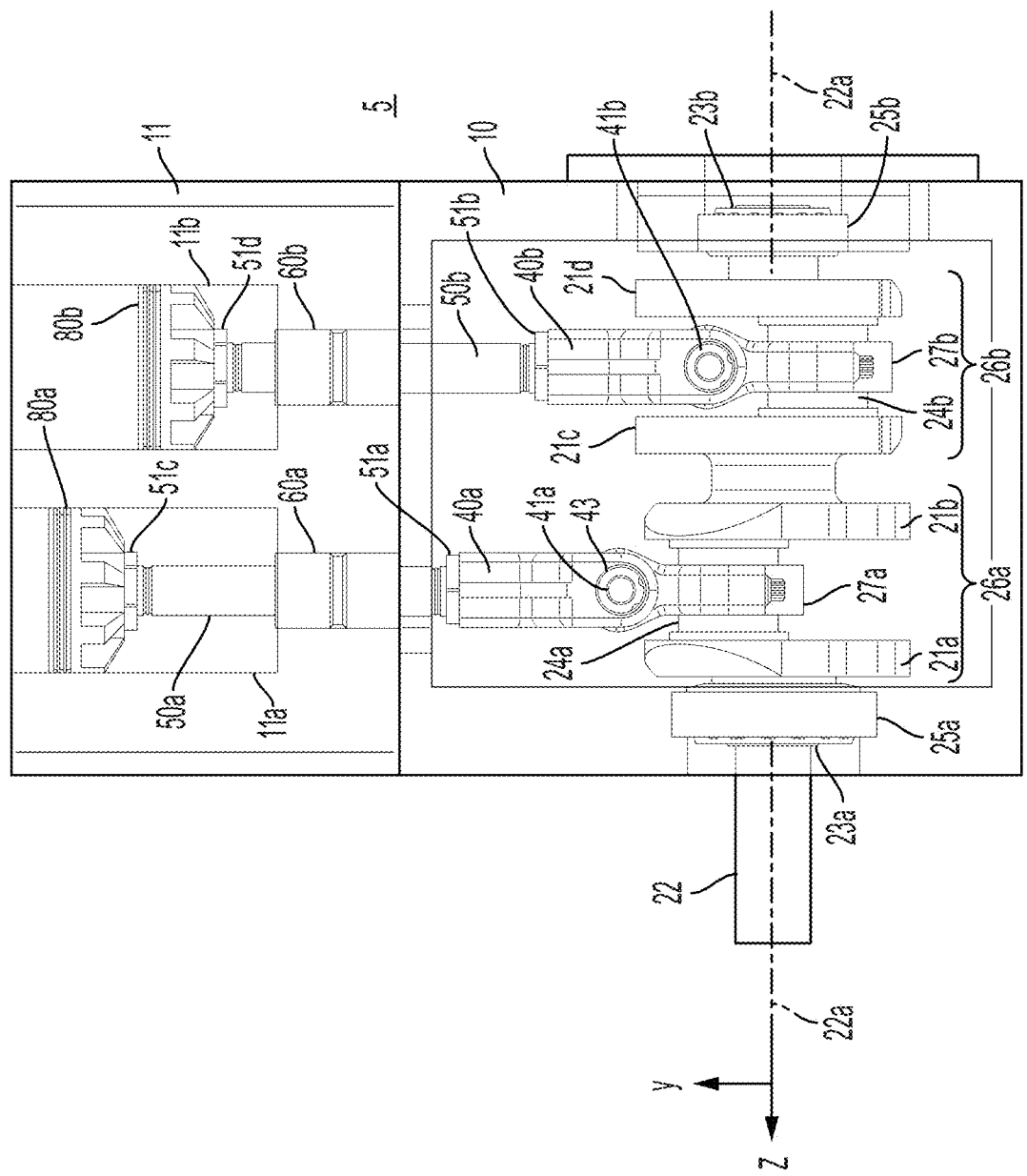
FIG. 2 is a front view of the exemplary tangent drive mechanism of FIG. 1, according to embodiments of the technology described herein.
Figure 3:
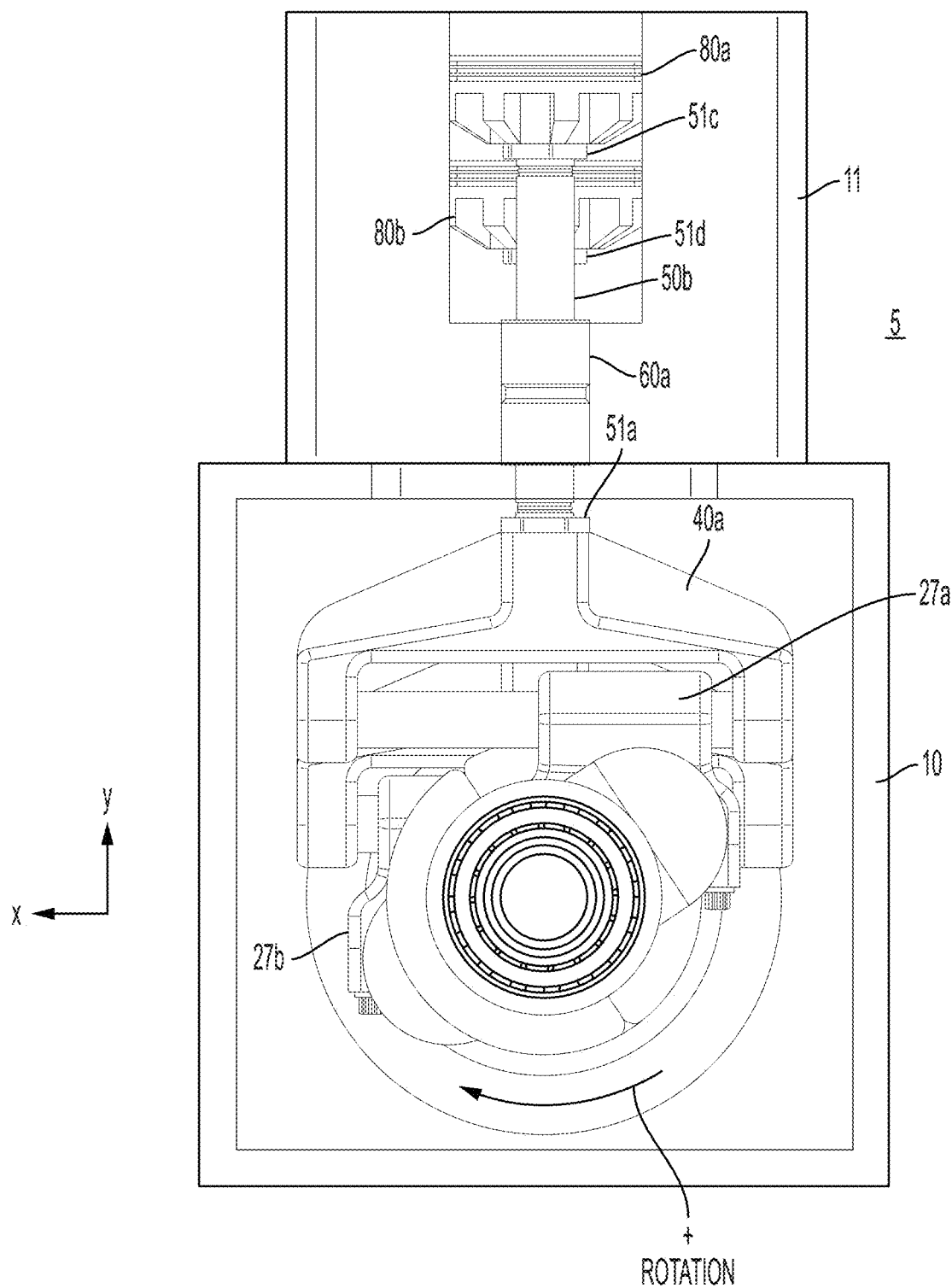
FIG. 3 is a side view of the exemplary tangent drive mechanism of FIG. 1, according to embodiments of the technology described herein.
Figure 4:
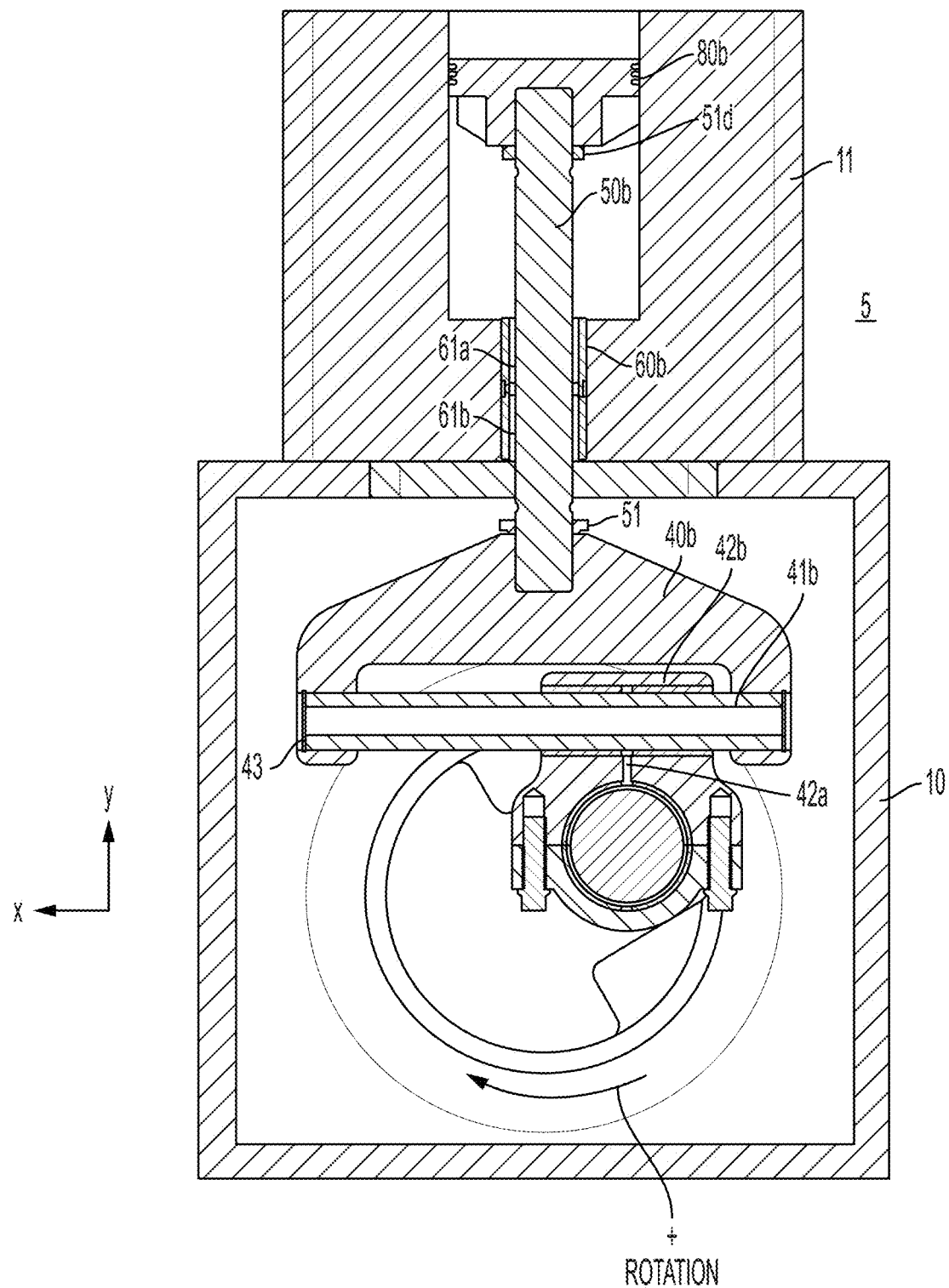
FIG. 4 is a section view through one of the pistons of the exemplary tangent drive mechanism of FIG. 1, according to embodiments of the technology described herein.
Figure 5:
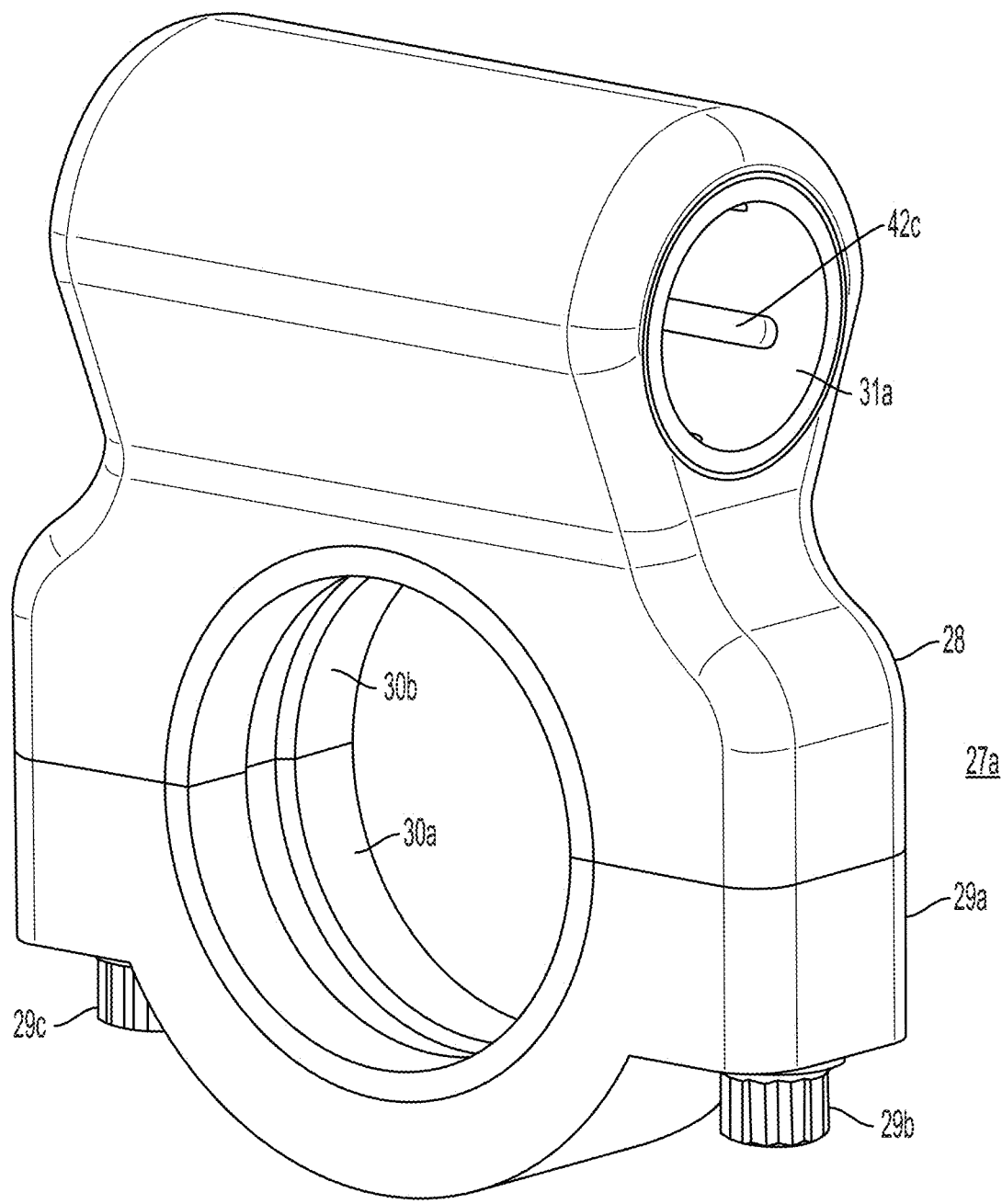
FIG. 5 shows an exemplary x-axis component of the exemplary tangent drive mechanism of FIG. 1, according to embodiments of the technology described herein.
Figure 6:
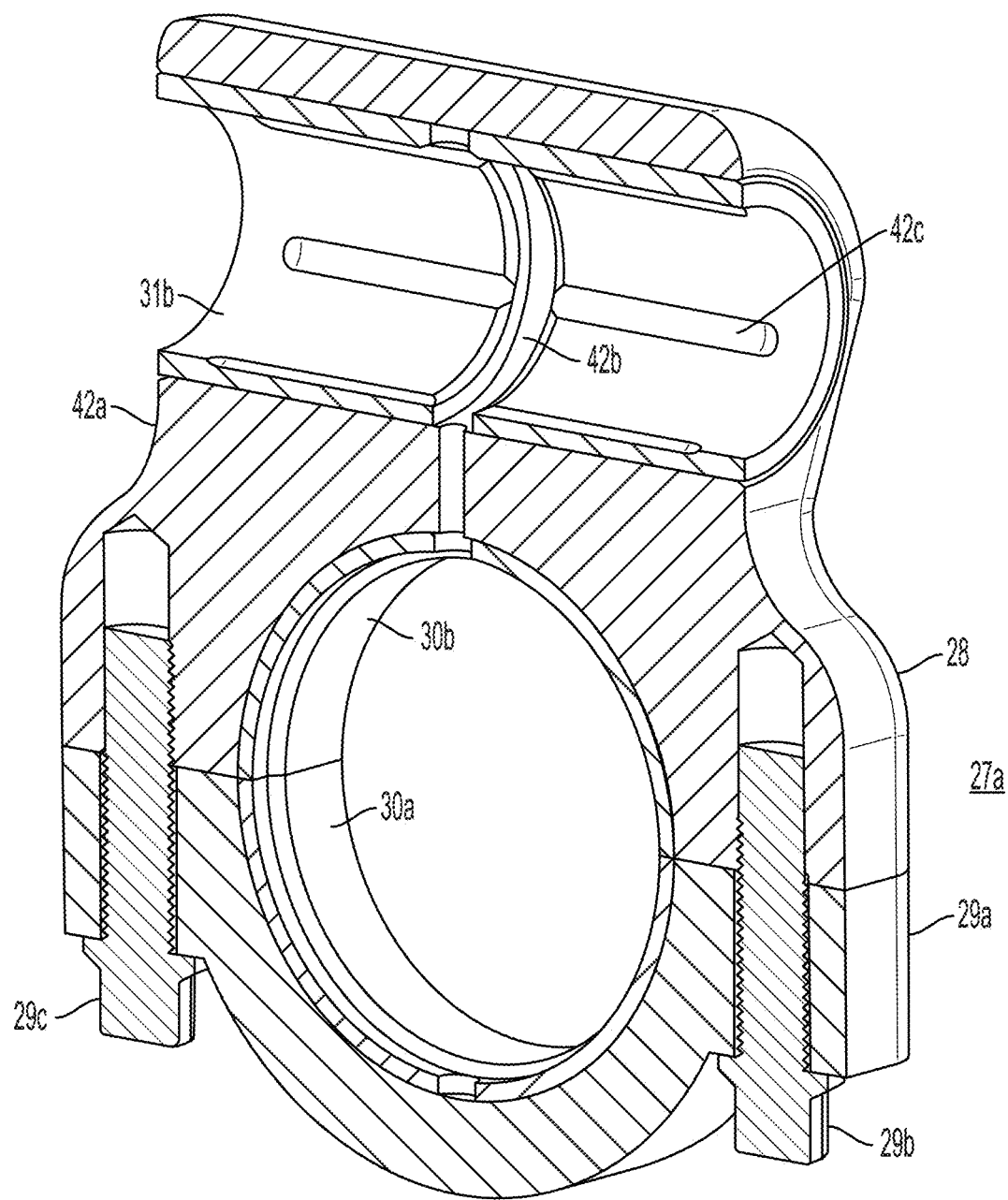
FIG. 6 is a section view through the exemplary x-axis component of FIG. 5, according to embodiments of the technology described herein.
Figure 7:
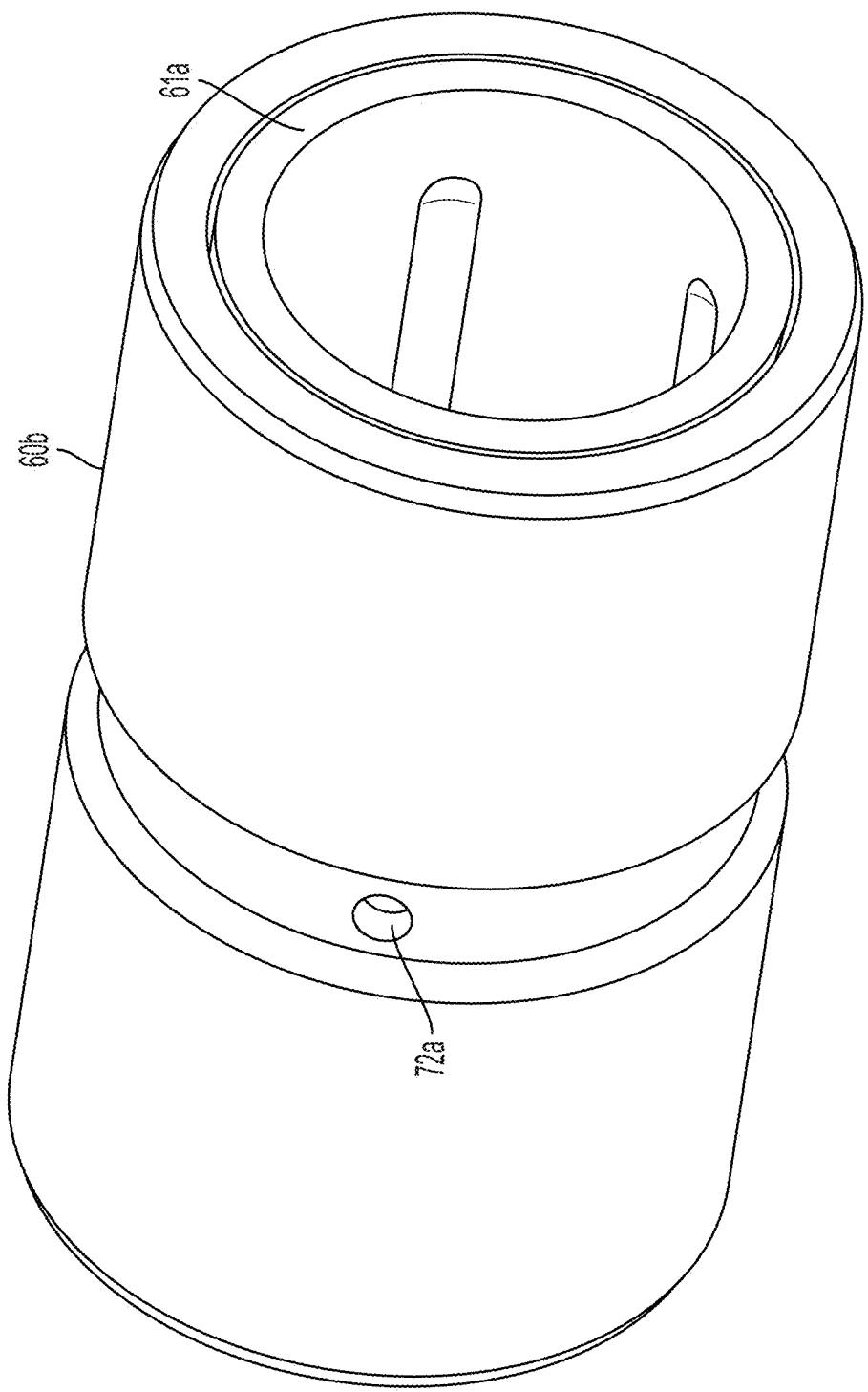
FIG. 7 is an exemplary piston rod bushing bearing assembly, according to embodiments of the technology described herein.
Figure 8:
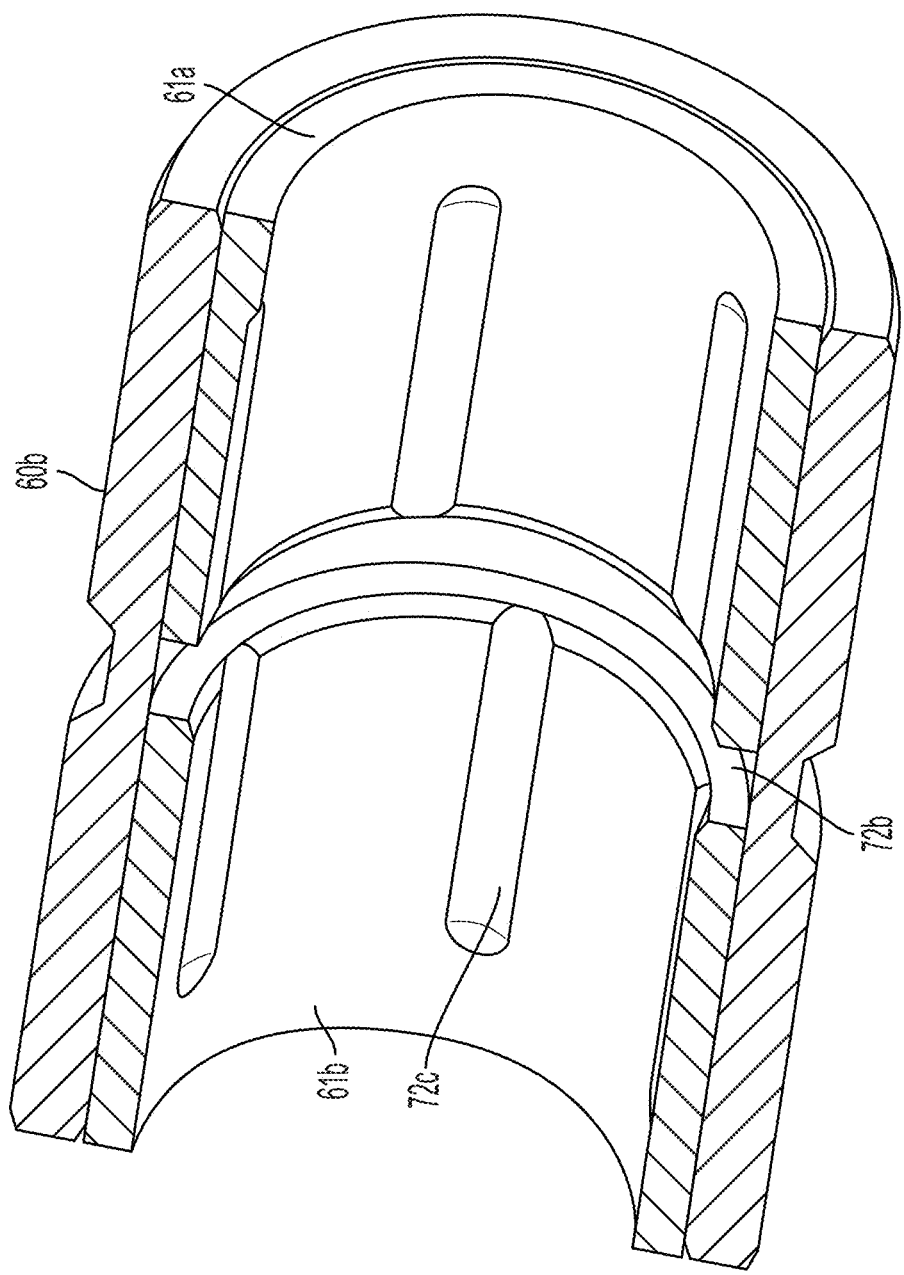
FIG. 8 is a section view through the exemplary piston rod bushing bearing assembly of FIG. 7, according to embodiments of the technology described herein.
Figure 9:
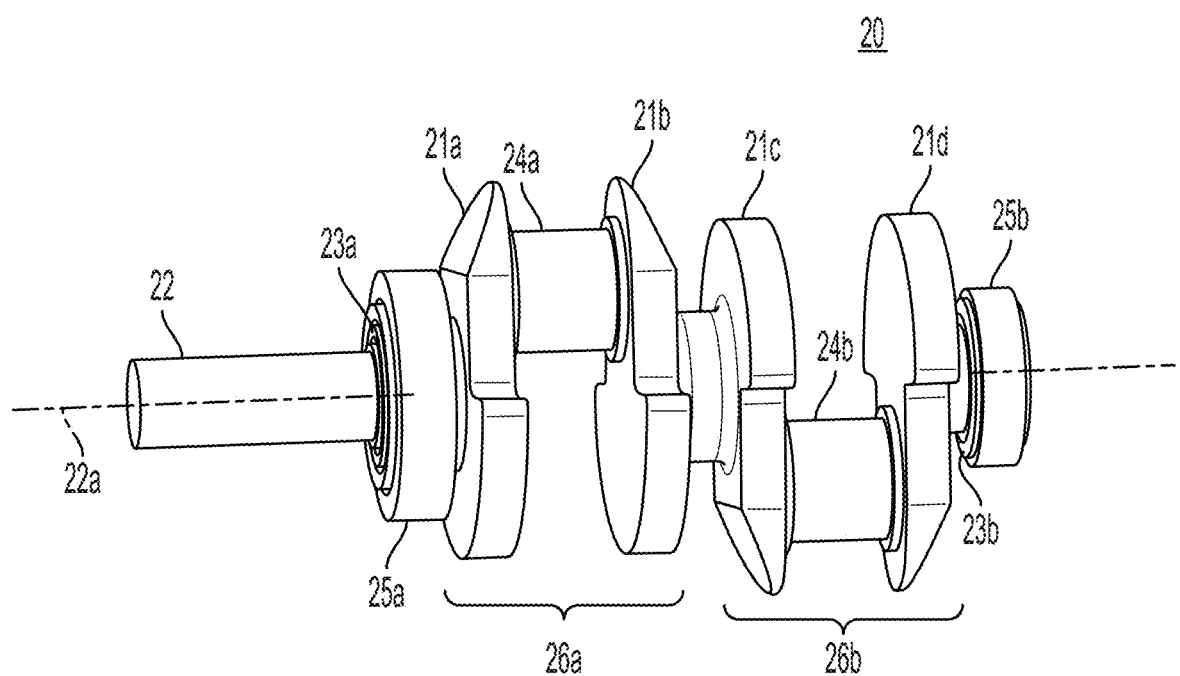
FIG. 9 is an exemplary crankshaft assembly, according to embodiments of the technology described herein.
Figure 10:
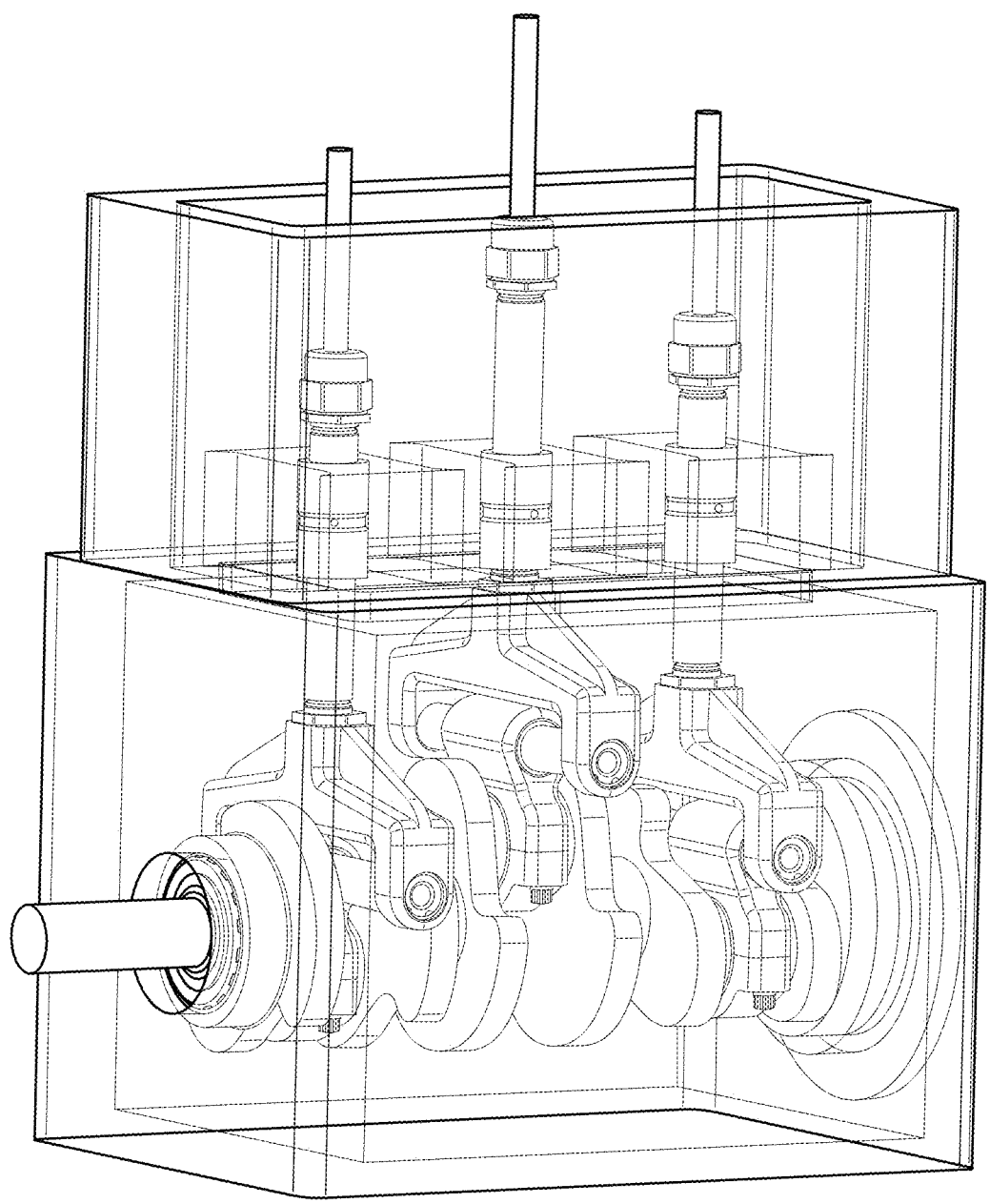
FIG. 10 is an exemplary triplex plunger pump using the exemplary tangent drive mechanism of FIG. 1, according to embodiments of the technology described herein.

FIGS. 1-3 show a perspective, front and side view of the tangent drive mechanism applied to a two-cylinder engine, pump, or compressor apparatus. The engine, pump, or compressor represented by apparatus 5 of FIGS. 1-3 shows the apparatus crankcase 10 and cylinder block 11 as outlined only for clarity. All other parts not essential to the instant invention are also not shown. FIG. 4 shows a section view through one of the pistons of apparatus 5 showing the main components of the invention. FIG. 5 shows the x-axis component and FIG. 6 shows a section through the x-axis component. FIG. 7 shows the piston rod bushing bearing assembly and FIG. 8 shows a section through the piston rod bushing bearing assembly. FIG. 9 shows the crankshaft assembly. FIG. 10 shows the current invention configured as a triplex plunger pump.

Crankshaft 20 includes input/output links 21a, 21b, 21c, 21d, input/output power shaft 22, main bearing journals 23a and 23b, and x-axis component bearing journals 24a and 24b. When operated as a pump or compressor, the power input shaft 22 drives the crankshaft in a circular motion. The power input shaft can be driven by an electric motor or IC engine (not shown). The links are integral parts of the monolithic crankshaft, which is made up of several input/output links and bearing journals. The crankshaft has oil lubricant passages drilled throughout to deliver oil under pressure to the bearings located on the journals. In the two-cylinder apparatus, as shown, there are main bearing journals 23a and 23b, and x-axis component bearing journals 24a and 24b. These bearing journals are designed to accommodate plain lubricated bearings or ball or roller bearings.

In the preferred embodiment, the x-axis component bearings are plain journal bearings and rely on a hydrodynamic oil film to reduce friction and protect the journal from metal to metal contact during rotation of the crankshaft 20. The main bearings journals 23a and 23b are located along the input shaft axis 22a. These main bearing journals can accommodate plain journal bearings with the same operating characteristics as the x-axis component bearings, or they can be lubricated ball or roller bearings. In the apparatus 5, as shown in FIGS. 1-3, tapered roller bearings 25a and 25b are used. Tapered roller bearings are sometimes used in crankshaft applications to accommodate the possibility of thrust forces along the crankshaft. The two cylinder apparatus, as shown in FIGS. 1-4, has a crankshaft 20 that consists of two crank throws 26a and 26b. Each throw is made up of two links and a bearing journal. In order to dynamically balance the rotation of the crankshaft and connected assemblies, the two crank throws are typically positioned 180° apart.

As shown in FIG. 1, the piston cylinders 11a and 11b are positioned side by side in block 11 (or base). That is, when looking at the cylinder block from direction z the centerline of the two cylinders have a zero angle between them. in cylinder block 11 (or base). This configuration is common for many engines, compressors, and pumps. An equally popular configuration in gas compression is a configuration where the two cylinders 11a and 11b are positioned 180° apart in cylinder block 11 (or base) when looking from the z direction. In gas compression the compressor can be configured to work in either a single acting or a double acting way, where the piston is compressing gas in both directions of the piston stroke. Also, in gas compression, the compressor can be configured to be a single stage compressor or a double (or more) stage compressor, where the first compression feeds the second compression and so on. The tangent drive mechanism works essentially the same for all of these gas compressor configurations.

In some embodiments, other crankshaft balancing features are employed such as extra weighing on various features of the crankshaft 20. As a main feature of the current invention much of the need for additional balancing techniques are essentially no longer necessary. This is due to the near elimination of the unbalanced x-axis forces caused by the motion of the crankshaft connecting-rod mechanism which is no longer present. The tangent drive mechanism essentially eliminates those unbalanced x-axis forces which have been replaced by only weak sliding frictional forces all while producing pure sinusoidal motion. For example, reciprocating gas compressors typically use a crankshaft/connecting rod/crosshead arrangement which generates large x-axis forces on the crosshead perpendicular to both the crankshaft axis of rotation and the y-axis (axis of the piston movement). This force is transmitted through the compressor and is a strong source of vibration. The tangent drive mechanism replaces the connecting rod and crosshead with a sliding x-axis component movement with only weak sliding frictional forces developed, essentially eliminating the need for additional balancing techniques.

Attached to the x-axis bearing journals 24a and 24b are the x-axis component assemblies 27a and 27b respectively. In some embodiments, the two assemblies 27a and 27b are identical. The x-axis component assembly 27a is shown separately in FIGS. 5 and 6. The x-axis component assemblies 27a and 27b are interfacing components that transfer power to and from the crankshaft 20 and their counterpart y-axis components 40a and 40b. The x-axis component is the key linking element in the tangent drive mechanism. It contains the linking bearing elements that make the smooth low friction sinusoidal movement possible and distinguish it over other similar sinusoidal movement mechanisms.

The x-axis component assemblies 27a and 27b are each comprised of a body 28, a journal bearing cap 29a, journal bearing cap bolts 29b and 29c, plain journal bearings 30a and 30b and two plain bushing bearings 31a and 31b. These two bushing bearings allow for the low friction movement of the x-axis linking element and distinguish this tangent drive mechanism from all other similar mechanisms. The use of two bushing bearings adds to the stability of the movement. In some embodiments, the x-axis body 28 and the journal bearing cap 29a are made of high strength steel, high strength aluminum or titanium. The plain bushing bearings 31a and 31b are designed to freely slide on the bushing bearing shafts 41a and 41b, which are fixedly attached to y-axis components 40a and 40b, respectively. In some embodiments, plain bushing bearings 31a and 31b are made of either a soft metal Babbitt material, which can be either cast in place or fitted in place as a pressed or heat shrunk part or locked in place by some means such as glue or separate screws. In other embodiments, the plain bushing bearings 31a and 31b can be made of an industrial plastic such as SP-21 VESPEL® and pressed or heat shrunk in place or locked in place by glue, dowel pins, or separate screws. Heat shrinking is a manufacturing technique that uses thermal expansion to fix assembled parts together and is commonly used.

Lubricating the bushing bearings is important for long life and reduced friction. As shown in FIG. 4, the lubrication holes 42a, the lubrication channel 42b, and lubrication grooves 42c allow for lubrication of the bushing bearings. High pressure oil is supplied to the bearings via oil feed passages drilled in the crankshaft 20. In some embodiments, oil pressures can range from 20 psig to 150 psig. In some embodiments, oil is pumped into the crankshaft 20 by an external pump, not shown. As an alternative to plain bushing bearings, the use of commercial ball bushings is also possible. In some embodiments, bushing bearing shafts 41a and 41b are identical and are made of high strength hardened steel, and are highly polished to give it a very smooth surface for the forced sliding of the lubricated bushing bearings 31a and 31b. A typical hardened shaft would have a Rockwell Hardness of HRC50 to HRC60. As discussed in many engineering texts and journals, surface hardness is a most important parameter. If a shaft surface is too soft (under 30 HRC for example) a plain bushing can damage the shaft, causing premature bearing failure, and requiring shaft replacement.

Shaft 41 is tightly fitted to y-axis component 40 and has snap rings 43 fixed on each end to retain the shaft in place. As an alternative, bushing bearing shaft 41 can be pressed or heat shrunk into position on y-axis component 40. Shaft 41 is very heavily loaded during operation of the invention, whether the application is an engine, pump or compressor. During operation there is typically a strong and variable load or force applied perpendicularly to its axis as the x-axis component slides back and forth along the shafts' length. The load (force) magnitude is very similar to that of the wrist pin in engine applications. In some embodiments, because of its somewhat long typical length {6" to 9") and being supported by its ends only, the material tensile and shear strength need to be very high and are critical engineering considerations. Typically, the high strength steels used in manufacture of engine wrist pins will be the material of choice for the bushing bearing shafts 41a and 41b. In some embodiments, alloy steels such as 1018, 4130, 4340, H13 and Maraging Steel C300 can be used.

Y-axis components 40a and 40b are fixed to the lower ends of the piston rods 50a and 50b respectively thus becoming part of a piston or piston rod assembly. The y-axis components 40a and 40b can be threaded on to piston rods 50a and 50b and locked into place by lock nuts 51a and 51b or, as an alternative, y-axis components 40a and 40b can be pressed or heat shrunk on to piston rods 50a and 50b respectively. In some embodiments, the piston rods are made of high strength hardened steel and highly polished to yield a very smooth surface for the forced sliding of the lubricated plain bushing bearings 61a and 61b. In some embodiments, a hardened piston rod would have a Rockwell Hardness of HRC50 to HRC60. The use of two bushing bearings on the y-axis piston rod slide adds stability and smooth operation to the overall mechanism and is a key design feature. Plain bushing bearings 61a and 61b are pressed or otherwise fixed into housings 60a and 60b.

FIGS. 7 and 8 show bearing housing assembly 60b. In some embodiments, housings 60a and 60b are typically made of steel or stainless steel and are fixed to the apparatus base. Fixing the y-axis movement to the piston rod movement is a key feature of the current invention. By fixing the y-axis components 40a and 40b to the piston assemblies and then the piston assemblies (piston rods) to the apparatus base, we remove important design constraints. Removing constraints such as the y-axis mounting and the y-axis movement that would dictate the required space and the exact placement of the pistons and cylinders. This invention feature essentially eliminates alignment, tolerancing and space issues. For example, by fixing the spatial relationship of the piston to the cylinder bore by the y-axis bushing bearings only the piston cylinder alignment and tolerancing is greatly improved.

In some embodiments, plain bushing bearings 61a and 61b are made of either a soft metal Babbitt material, which can be either cast in place or fitted in place as a pressed part or locked in place by some means such as glue or separate screws. The plain bushing bearings 61a and 61b can be made of an industrial bearing grade plastic such as SP-21 VESPEL® and pressed in place or locked in place by glue or separate screws. Lubricating the bushing bearings is important for long life and reduced friction. Shown in FIGS. 7 and 8 are the lubrication holes 72a, the lubrication channel 72b, lubrication grooves 72c. High pressure oil is supplied to the bearings via oil feed passages drilled in the crankshaft. Typical oil pressures can range from 20 psig to 150 psig. Oil is typically pumped into the crankshaft by an external pump, not shown. As an alternative to plain single material bushing bearings the use of commercial linear ball bushings such as THOMSON TYPE SUPER METRIC ball bushing is also possible.

Pistons 80a and 80b are attached to the top end of piston rods 50a and 50b respectively. In some embodiments, pistons 80a and 80b can be threaded on to piston rods 50a and 50b and locked into place by lock nuts 51c and 51d or, as an alternative, pistons 80a and 80b can be pressed or heat shrunk on to piston rods 50a and 50b respectively. In operation as a pump or compressor, the inventions' power input is applied to input shaft 22 of crankshaft 20 and drives the crankshaft in a circular orbit around crankshaft axis 22a. A clockwise rotation is shown in the figure as a, +rotation, a counter-clockwise rotation would have a, −rotation.

FIG. 10 shows the invention configured as a liquid or volatile gas triplex plunger pump. Where three plunger pump pistons are driven by the input power shaft. The crank throws driving each piston are positioned 120° apart around the crankshaft. This design is made possible by the unique feature of the invention where the y-axis movement is fixed to the piston rod movement relative to the pump base. This allows the x-axis component, which is slidingly fixed to the y-axis piston assembly the ability to move perpendicularly to the y-axis for any number of y-axis piston assemblies. The simplicity of the design allows for more piston throws to be positioned at different angles around the crankshaft. For example, 6 piston crank throws could be positioned around the crankshaft at 60°; or 5 piston throws at 72°; or 4 or 8 piston throws positioned at 45°.

Variations, modifications, and other implementations of what is described herein will occur to those of ordinary skill in the art without departing from the spirit and the scope of the invention. Accordingly, the invention is not to be limited only to the preceding illustrative descriptions.

What is claimed is:

1. A system comprising a reciprocating mechanism, the system comprising: at least one axially translating y-axis component configured to reciprocate substantially along a y-axis with a reciprocating motion of a piston assembly relative to a base to which the piston assembly is slidingly attached via at least one y-axis component bearing assembly; at least one x-axis component slidingly coupled via at least one x-axis component bearing assembly to and translating with the at least one y-axis component along the y-axis, the at least one x-axis component bearing assembly attached to a bearing shaft via plain bushing bearings fixed to the at least one x-axis component and slidingly attached to the at least one y-axis component via the bearing shaft on which the plain bushing bearing slides, wherein the at least one x-axis component comprises an orbital output component comprising an x-axis component assembly and an orbital linking component comprising an x-axis component bearing journal disposed substantially concentric with the orbital output component; a stationary output component comprising a power shaft rotatably attached to the base in a direction that is substantially perpendicular to both the x-axis and y-axis, wherein the stationary output component engages with the orbital output component via a first integral interconnecting output link; and a stationary linking component comprising a power shaft main bearing journal rotatably attached to the base in a direction that is substantially concentric with the stationary output component, wherein the stationary linking component engages with the orbital linking component of the at least one x-axis component via the first integral interconnecting output link.

2. The system of claim 1, wherein the at least one x-axis component is configured to reciprocate substantially perpendicularly to the y-axis relative to the at least one y-axis component.

3. The system of claim 1, wherein the plain bushing bearing each comprise at least one oil groove machined on the inner diameter of the bushing bearing.

4. The system of claim 1, wherein the plain bushing bearings comprise at least one plain bushing bearing assembly fixed to the at least one y-axis component and slidingly attached to the at least one x-axis component via the bearing shaft on which the plain bushing bearing slides.

5. The system of claim 3, wherein the bearing shaft comprises a hardened polished steel shaft.

6. The system of claim 1, wherein the piston assembly comprises a piston and a piston rod.

7. The system of claim 6, wherein the piston rod is slidingly attached to the base via a plain bushing bearing.

8. The system of claim 6, wherein the piston rod comprises a hardened polished steel shaft.

9. The system of claim 1, wherein a plurality of y-axis components are slidingly coupled to the x-axis component.

10. The system of claim 9, wherein each y-axis component is attached to and reciprocating with a corresponding piston assembly.

11. The system of claim 1, wherein each of the bearing assemblies comprise a plain bushing bearing comprising at least one of the following commercial bearing materials:
Babbitt soft metal; Brass;
Bearing grade VESPEL® plastic;
Bearing grade TORLON® plastic; or
Bearing grade PEEK® plastic.

12. The system of claim 1, wherein the bearing assemblies comprise at least one recirculating ball bushing assembly.

13. The system of claim 1, wherein each of the bearing assemblies comprise a plain bushing bearing comprising a commercial plastic bearing material.

14. A reciprocating engine comprising: at least one axially translating y-axis component configured to reciprocate substantially along a y-axis with a reciprocating motion of a piston assembly relative to a base to which the piston assembly is slidingly attached via at least one y-axis component bearing assembly; at least one x-axis component slidingly coupled via at least one x-axis component bearing assembly to and translating with the at least one y-axis component along the y-axis, the at least one x-axis component bearing assembly attached to a bearing shaft via plain bushing bearings fixed to the at least one x-axis component and slidingly attached to the at least one y-axis component via the bearing shaft on which the plain bushing bearing slides, wherein the at least one x-axis component comprises an orbital output component comprising an x-axis component assembly and an orbital linking component comprising an x-axis component bearing journal disposed substantially concentric with the orbital output component; a stationary output component comprising a power shaft rotatably attached to the base in a direction that is substantially perpendicular to both the x-axis and y-axis, wherein the stationary output component engages with the orbital output component via a first integral interconnecting output link; and a stationary linking component comprising a power shaft main bearing journal rotatably attached to the base in a direction that is substantially concentric with the stationary output component, wherein the stationary linking component engages with the orbital linking component of the at least one x-axis component via the first integral interconnecting output link.

15. A reciprocating compressor comprising: at least one axially translating y-axis component configured to reciprocate substantially along a y-axis with a reciprocating motion of a piston assembly relative to a base to which the piston assembly is slidingly attached via at least one y-axis component bearing assembly; at least one x-axis component slidingly coupled via at least one x-axis component bearing assembly to and translating with the at least one y-axis component along the y-axis, the at least one x-axis component bearing assembly attached to a bearing shaft via plain bushing bearings fixed to the at least one x-axis component and slidingly attached to the at least one y-axis component via the bearing shaft on which the plain bushing bearing slides, wherein the at least one x-axis component comprises an orbital output component comprising an x-axis component assembly and an orbital linking component comprising an x-axis component bearing journal disposed substantially concentric with the orbital output component; a stationary output component comprising a power shaft rotatably attached to the base in a direction that is substantially perpendicular to both the x-axis and y-axis, wherein the stationary output component engages with the orbital output component via a first integral interconnecting output link; and a stationary linking component comprising a power shaft main bearing journal rotatably attached to the base in a direction that is substantially concentric with the stationary output component, wherein the stationary linking component engages with the orbital linking component of the at least one x-axis component via the first integral interconnecting output link.

16. A reciprocating pump comprising: at least one axially translating y-axis component configured to reciprocate substantially along a y-axis with a reciprocating motion of a piston assembly relative to a base to which the piston assembly is slidingly attached via at least one y-axis component bearing assembly; at least one x-axis component slidingly coupled via a bearing shaft and an x-axis component bearing assembly to and translating with the at least one y-axis component along the y-axis, the at least one x-axis component bearing assembly attached to the bearing shaft via plain bushing bearings fixed to the at least one x-axis component and slidingly attached to the at least one y-axis component via the bearing shaft on which the plain bushing bearing slides, wherein the at least one x-axis component comprises an orbital output component comprising an x-axis component assembly and an orbital linking component comprising an x-axis component bearing journal disposed substantially concentric with the orbital output component;

a stationary output component comprising a power shaft rotatably attached to the base in a direction that is substantially perpendicular to both the x-axis and y-axis, wherein the stationary output component engages with the orbital output component via a first integral interconnecting output link; and a stationary linking component comprising a power shaft main bearing journal rotatably attached to the base in a direction that is substantially concentric with the stationary output component, wherein the stationary linking component engages with the orbital linking component of the at least one x-axis component via the first integral interconnecting output link.

17. The reciprocating engine of claim 14, wherein the at least one x-axis component is configured to reciprocate substantially perpendicularly to the y-axis relative to the at least one y-axis component.

18. The reciprocating engine of claim 14, wherein the plain bushing bearings each comprise at least one oil groove machined on the inner diameter of the bushing bearing.

19. The reciprocating engine of claim 14, wherein the plain bushing bearings comprise at least one plain bushing bearing assembly fixed to the at least one y-axis component and slidingly attached to the at least one x-axis component via the bearing shaft on which the plain bushing bearing slides.

20. The reciprocating engine of claim 18, wherein the bearing shaft comprises a hardened polished steel shaft.

21. The reciprocating engine of claim 14, wherein the piston assembly comprises a piston and a piston rod.

22. The reciprocating engine of claim 21, wherein the piston rod is slidingly attached to the base via a plain bushing bearing.

23. The reciprocating engine of claim 21, wherein the piston rod comprises a hardened polished steel shaft.

24. The reciprocating engine of claim 14, wherein a plurality of y-axis components are slidingly coupled to the x-axis component.

25. The reciprocating engine of claim 24, wherein each y-axis component is attached to and reciprocating with a corresponding piston assembly.

26. The reciprocating engine of claim 14, wherein each of the bearing assemblies comprise a plain bushing bearing comprising at least one of the following commercial bearing materials:
   Babbitt soft metal; Brass;
   Bearing grade VESPEL® plastic;
   Bearing grade TORLON® plastic; or
   Bearing grade PEEK® plastic.

27. The reciprocating engine of claim 14, wherein the bearing assemblies comprise at least one recirculating ball bushing assembly.

28. The reciprocating engine of claim 14, wherein each of the bearing assemblies comprise a plain bushing bearing comprising a commercial plastic bearing material.

29. The reciprocating compressor of claim 14, wherein the at least one x-axis component is configured to reciprocate substantially perpendicularly to the y-axis relative to the at least one y-axis component.

30. The reciprocating compressor of claim 15, wherein the plain bushing bearings each comprise at least one oil groove machined on the inner diameter of the bushing bearing.

31. The reciprocating compressor of claim 15, wherein the plain bushing bearings comprise at least one plain bushing bearing assembly fixed to the at least one y-axis component and slidingly attached to the at least one x-axis component via the bearing shaft on which the plain bushing bearing slides.

32. The reciprocating compressor of claim 30, wherein the bearing shaft comprises a hardened polished steel shaft.

33. The reciprocating compressor of claim 15, wherein the piston assembly comprises a piston and a piston rod.

34. The reciprocating compressor of claim 33, wherein the piston rod is slidingly attached to the base via a plain bushing bearing.

35. The reciprocating compressor of claim 33, wherein the piston rod comprises a hardened polished steel shaft.

36. The reciprocating compressor of claim 15, wherein a plurality of y-axis components are slidingly coupled to the x-axis component.

37. The reciprocating compressor of claim 36, wherein each y-axis component is attached to and reciprocating with a corresponding piston assembly.

38. The reciprocating compressor of claim 15, wherein each of the bearing assemblies comprise a plain bushing bearing comprising at least one of the following commercial bearing materials:
   Babbitt soft metal; Brass;
   Bearing grade VESPEL® plastic;
   Bearing grade TORLON® plastic; or
   Bearing grade PEEK® plastic.

39. The reciprocating compressor of claim 15, wherein the bearing assemblies comprise at least one recirculating ball bushing assembly.

40. The reciprocating compressor of claim 15, wherein each of the bearing assemblies comprise a plain bushing bearing comprising a commercial plastic bearing material.

41. The reciprocating pump of claim 16, wherein the at least one x-axis component is configured to reciprocate substantially perpendicularly to the y-axis relative to the at least one y-axis component.

42. The reciprocating pump of claim 16, wherein the plain bushing bearings each comprise at least one oil groove machined on the inner diameter of the bushing bearing.

43. The reciprocating pump of claim 16, wherein the plain bushing bearings comprise at least one plain bushing bearing assembly fixed to the at least one y-axis component and slidingly attached to the at least one x-axis component via the bearing shaft on which the plain bushing bearing slides.

44. The reciprocating pump of claim 42, wherein the bearing shaft comprises a hardened polished steel shaft.

45. The reciprocating pump of claim 16, wherein the piston assembly comprises a piston and a piston rod.

46. The reciprocating pump of claim 45, wherein the piston rod is slidingly attached to the base via a plain bushing bearing.

47. The reciprocating pump of claim 45, wherein the piston rod comprises a hardened polished steel shaft.

48. The reciprocating pump of claim 16, wherein a plurality of y-axis components are slidingly coupled to the x-axis component.

49. The reciprocating pump of claim 48, wherein each y-axis component is attached to and reciprocating with a corresponding piston assembly.

50. The reciprocating pump of claim 16, wherein each of the bearing assemblies comprise a plain bushing bearing comprising at least one of the following commercial bearing materials:
   Babbitt soft metal; Brass;
   Bearing grade VESPEL® plastic;
   Bearing grade TORLON® plastic; or
   Bearing grade PEEK® plastic.

51. The reciprocating pump of claim 16, wherein the bearing assemblies comprise at least one recirculating ball bushing assembly.

52. The reciprocating pump of claim 16, wherein each of the bearing assemblies comprise a plain bushing bearing comprising a commercial plastic bearing material.

* * * * *